No. 703,624. Patented July 1, 1902.
J. J. THOMPSON.
SULKY HAY RAKE.
(Application filed Feb. 18, 1902.)
(No Model.) 2 Sheets—Sheet 1.
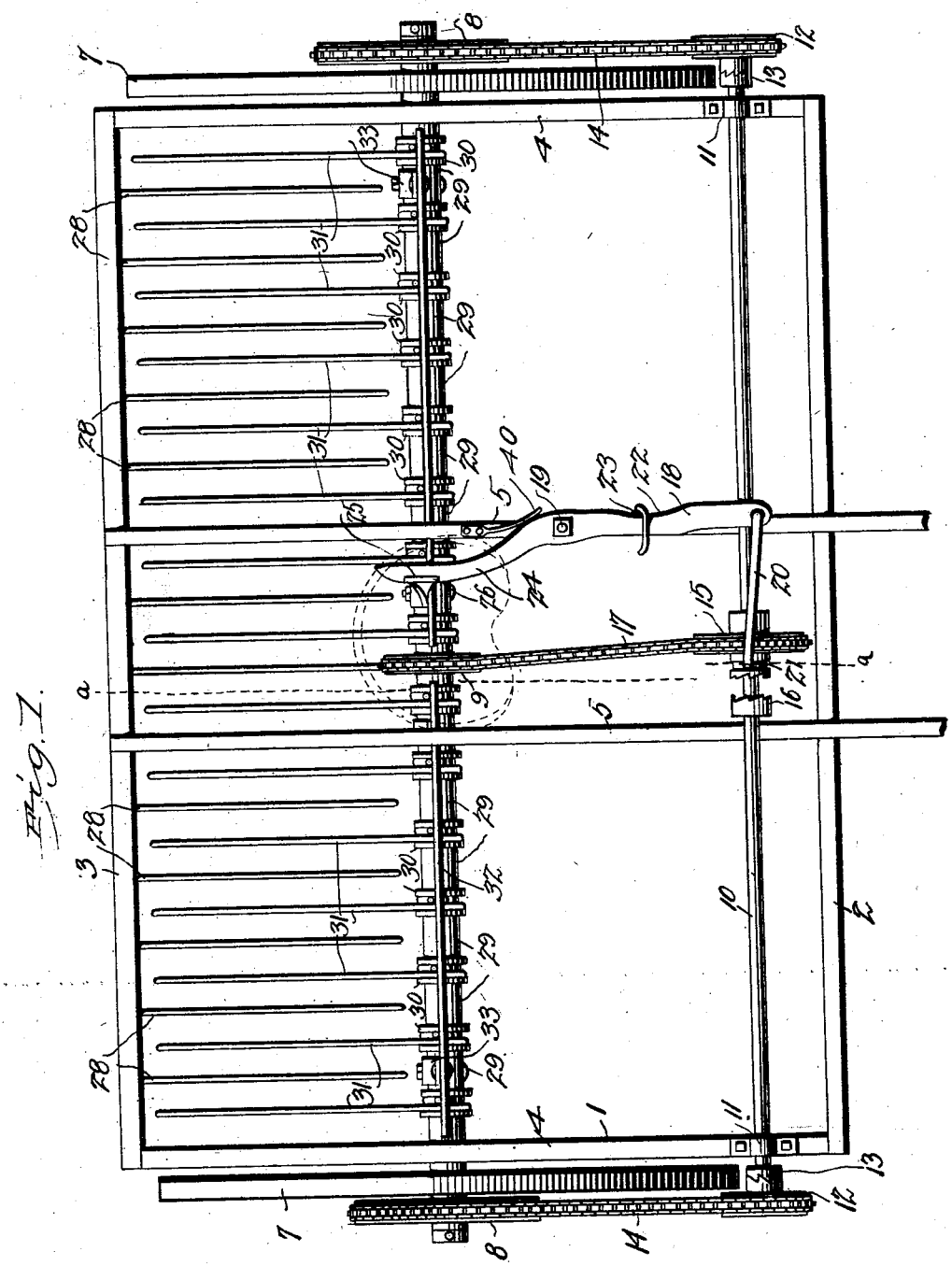
Witnesses
J. J. Thompson, Inventor.
by
Attorneys

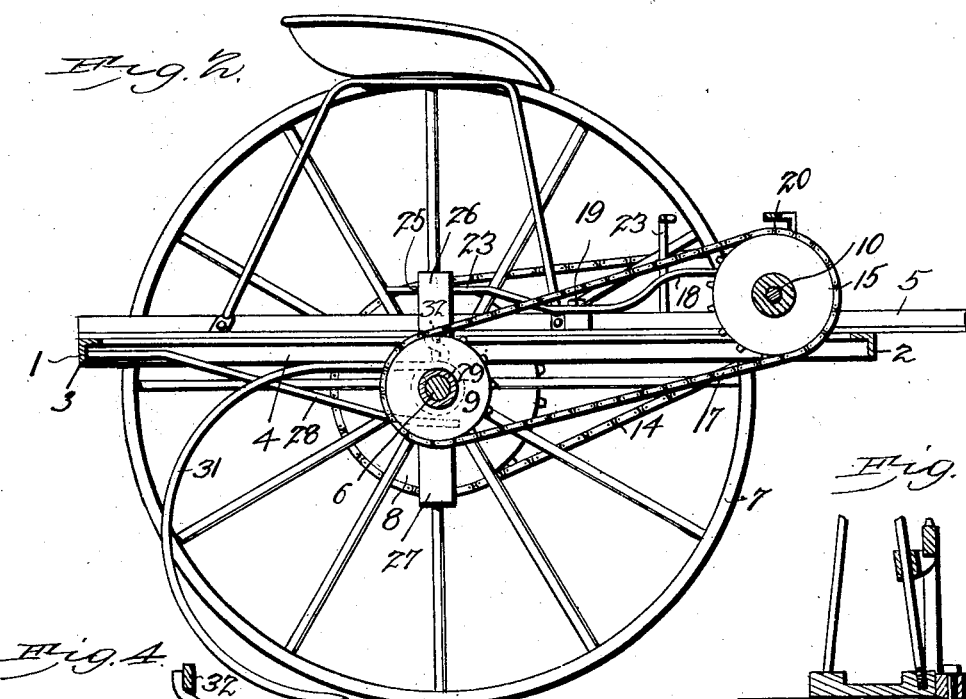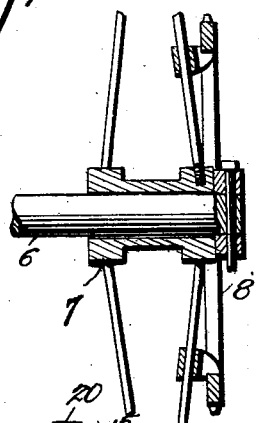

UNITED STATES PATENT OFFICE.

JOHN JAMES THOMPSON, OF LEWISTOWN, MONTANA.

SULKY HAY-RAKE.

SPECIFICATION forming part of Letters Patent No. 703,624, dated July 1, 1902.

Application filed February 18, 1902. Serial No. 94,685. (No model.)

*To all whom it may concern:*

Be it known that I, JOHN JAMES THOMPSON, a citizen of the United States, residing at Lewistown, in the county of Fergus and State of Montana, have invented a new and useful Sulky Hay-Rake, of which the following is a specification.

My invention is an improved sulky hay-rake; and it consists in the peculiar construction and combination of devices hereinafter fully set forth and claimed.

In the accompanying drawings, Figure 1 is a top plan view of a sulky hay-rake embodying my improvements. Fig. 2 is a vertical sectional view of the same, taken on a plane indicated by the line $aa$ of Fig. 1 and showing the rake-teeth in the position assumed thereby when raking up the hay. Fig. 3 is a similar view showing the rake-teeth raised to inoperative position. Fig. 4 is a detail sectional view showing the axle-shaft, one of the sleeves thereon, one of the rake-teeth attached to the sleeve, and the securing-bar to which the rake-tooth is also attached. Fig. 5 is a detail sectional view taken on a plane at right angles to that of Fig. 4. Fig. 6 is a detail sectional view of one of the driving and supporting wheels. Fig. 7 is a detail view showing a modification of the means for connecting the rake-teeth to the lock-bar.

The sulky-frame 1 may be of any suitable construction, but in the embodiment of my invention here shown is rectangular in form, comprises the front and rear bars 2 3 and the side bars 4, which connect the front and rear bars together at the ends thereof. The thills have rearward extensions or draft-bars 5, which connect the front and rear bars 2 3 together at points near the centers thereof.

The axle-shaft 6 is revoluble in suitable bearings on the under sides of the bars 4. The supporting-wheels 7 are revoluble on the spindles of the axle-shaft and independently of the latter, and each of the driving-wheels has a sprocket-wheel 8, which may be either an integral portion thereof or formed separately therefrom and secured thereto, as shown in Fig. 6. The sprocket-wheels 8 rotate with the supporting-wheels 7 and independently of the axle-shaft. The latter is provided at or near its center with a sprocket-wheel 9, which is keyed or otherwise secured thereto and rotates therewith. A counter-shaft 10 is journaled in suitable bearings 11, which are disposed near the front side of the frame 1. On the ends of the said counter-shaft are loose sprocket-wheels 12, each of which is normally secured to the counter-shaft by a spring-pressed ratchet-clutch 13. The said ratchet-clutches enable the sprocket-wheels 12 to turn in one direction independently of the counter-shaft, but lock the same thereto when revolved in the opposite direction to cause the counter-shaft to revolve therewith. Endless sprocket-chains 14 connect the sprocket-wheels 8 to the sprocket-wheels 12, so that when the machine is in motion and is advancing the counter-shaft 10 will be rotated in the direction indicated by the arrow in Fig. 2, as will be understood.

A sprocket-wheel 15 is loose on the counter-shaft 10 near the center thereof and in the embodiment of my invention here shown is adapted to be moved longitudinally a slight distance on the counter-shaft to engage and disengage a clutch 16. When engaged with said clutch, the wheel 15 is locked to and revolves with the counter-shaft. An endless sprocket-chain 17 connects the sprocket-wheel 9 on the axle-shaft with the sprocket-wheel 15 on the counter-shaft. It will be understood from the foregoing that when the machine is in motion and the sprocket-wheel 15 is engaged with the clutch 16 the chain 17 and sprocket-wheel 9 will cause power to be communicated from the wheel 15 to the axle-shaft and that when the wheel 15 is disengaged from the clutch 16 the axle-shaft will remain at rest. A lever 18 in the embodiment of my invention here shown is fulcrumed, as at 19, on one of the draft-bars 5 and is connected by a link-rod 20 and strap 21 to the hub or sleeve of the wheel 15, so that the latter may be engaged with or disengaged from the clutch 16 by shifting the said lever. The said lever 18 is curved or laterally extended at a suitable distance from its front end to form a cam 22. A foot-lever 23, which is adapted to be operated by the foot of the driver and is pivotally connected to the bar 5 under the lever 18, by coaction with the cam 22 of the latter when the said foot-lever is moved forwardly shifts the lever 18 and engages the wheel 15 with the cam 16. The lever 18 is provided with a rearwardly-extending arm 24, which is curved laterally and is provided on its convex side with a notch 25. The axle-shaft is provided with a pair of oppositely-extending radial lock-arms 26 27, which are adapted to be successively engaged with the notch 25 to lock the axle-shaft against rotation. A series of cleaning-bars 28 project forwardly from the rear side of the sulky-frame and are disposed at suitable regular distances apart.

A series of tubular sleeves 29 are placed on the axle-shaft between the sides of the frame and are provided with annular flanges 30. The rake-teeth 31, which are preferably of the form here shown, have their upper portions coiled around the sleeves 29, between the respective annular flanges 30 thereof, and have their extreme upper end portions bent radially with reference to the axle-shaft and secured to a lock-bar 32, which is rigidly secured to the axle-shaft, as at 33, and is disposed longitudinally thereon and radially with reference thereto, as shown in Figs. 1 and 4. The said lock-bar is provided with openings 37, through which the upper end portions of the rake-teeth are passed, and thereby the rake-teeth are secured so firmly to the lock-bar, which is fast to the axle-shaft, that the rake-teeth are caused to rotate with the axle-shaft when the latter is revolved. The rake-teeth are disposed in the spaces between the respective cleaning-bars 28. When the arm 26 of the axle-shaft is in engagement with the notch 25 of the lever-arm 24, the rake-teeth are lowered in operative position, as shown in Fig. 2. When the rake-teeth are in this position, ready for raking hay, the wheel 15 is loose on the counter-shaft. When the rake-teeth have become loaded with the hay and it is desired to discharge the same in a windrow, the lever 18 is shifted, by means of the foot-lever 23, to lock the wheel 15 to the counter-shaft by engaging said wheel with the clutch. This movement of the lever 18 disengages the notched arm 24 from the arm 26, and the axle-shaft is then revolved by the means and the manner hereinbefore described, causing the rake-teeth to make a complete revolution. On the initial upward movement of the rake-teeth the latter discharge the hay onto the windrow, the clearing-arms 28 coacting with the rake-teeth to disengage the hay therefrom. As the rake-teeth and axle-shaft complete their revolution the notched arm 24 is caused by a spring 40, which acts on the lever 18, to reëngage the arm 26, lock the axle-shaft against rotation while the rake-teeth are in operative position, and this movement of the lever 18 unlocks the wheel 15 from the counter-shaft 10, thus throwing the axle-shaft, which forms the rake-head, out of operative engagement with the counter-shaft. The latter is continuously in rotation while the machine is in motion, but the rake-head is intermittently rotated only when the rake-teeth have become loaded.

When moving the sulky-rake from one place to another and when the same is not in operation, the rake-teeth are locked in the elevated position (shown in Fig. 3) by engaging the notched arm 24 of the lever 18 with the arm 27 of the axle-shaft.

The lock-arms 26 27 instead of extending in opposite directions, as hereinbefore described, may be disposed at right angles to each other, as indicated in dotted lines in Fig. 3, and thus cause the rake to hang in rear of the axle when raised to inoperative position, as will be understood.

In Fig. 7 of the drawings I show a modification in which an eyebolt 39 is disposed in and adapted to move axially in the opening 37 of the lock-bar 32, and the upper end portion of the rake-tooth is connected to the eye of the bolt, as at 40. A coiled extensile spring 41, disposed on the shank of the bolt, bears against the lock-bar and the nut on the bolt. By this construction the tooth is adapted to partly turn on the axle-shaft against the tension of the spring 41 when the tooth encounters a stone, stump, or other obstruction, and hence injury to the tooth is avoided.

Having thus described my invention, I claim—

1. In a horse hay-rake, the combination of a frame, a revoluble axle-shaft having rake-teeth, supporting-wheels revoluble on and independently of the axle-shaft, a counter-shaft, power connections between the same and one of the supporting-wheels, whereby the counter-shaft is rotated, and power connections including a clutch, between the counter-shaft and the axle-shaft, whereby the latter and the rake-teeth carried thereby may be rotated at will by power from the counter-shaft, substantially as described.

2. In a horse hay-rake, the combination of a frame, a revoluble axle-shaft having rake-teeth, supporting-wheels revoluble on and independently of the axle-shaft, a counter-shaft, power connections between the same and one of the supporting-wheels, whereby the counter-shaft is rotated, power connections, including a clutch, between the counter-shaft and the axle-shaft and a lever to operate the clutch, the lever and the axle-shaft having coacting stops to lock the axle-shaft against rotation when the power connections are unclutched from the counter-shaft, substantially as described.

3. In a horse hay-rake, the combination of a frame, a revoluble axle-shaft having rake-teeth, supporting-wheels revoluble on and independently of the axle-shaft, a counter-shaft, power connections between the same and one of the supporting-wheels, whereby the counter-shaft is rotated, power connections, including a clutch, between the counter-shaft and the axle-shaft and a lever to operate the clutch, said lever having a notched arm, and a lock-arm, carried by the axle-shaft and engaged with the notched arm, to lock the axle-shaft against rotation when the power connections are unclutched from the counter-shaft, substantially as described.

4. In a horse hay-rake, the combination of a frame, a revoluble axle-shaft having rake-teeth, supporting-wheels revoluble on and independently of the axle-shaft, a counter-shaft, power connections between the same and one of the supporting-wheels, whereby the counter-shaft is rotated, power connections, including a clutch, between the counter-shaft and the axle-shaft and a lever to operate the clutch, and a stop element carried by the axle-shaft, coacting with the lever to lock the axle-shaft against rotation when the power connections are unclutched from the counter-shaft, substantially as described.

5. In a horse hay-rake, the combination of a frame, a revoluble axle-shaft having rake-teeth, supporting-wheels revoluble on and independently of the axle-shaft, a counter-shaft, power connections between the same and one of the supporting-wheels, whereby the counter-shaft is rotated, power connections, including a clutch, between the counter-shaft and the axle-shaft and a lever to operate the clutch, a stop element carried by the axle-shaft, coacting with the lever to lock the axle-shaft against rotation when the power connections are unclutched from the counter-shaft, and a foot-lever to operate the first-mentioned lever, substantially as described.

6. In a horse hay-rake, the combination of a shaft, a lock-bar in fixed relation thereto, a rake-tooth pivotally connected to the shaft and having its upper end extended above the shaft, and a connection, including a spring, between the lock-bar and the said extended upper end of the tooth, whereby the latter is adapted to turn on the shaft against the tension of the spring, for the purpose set forth, substantially as described.

In testimony that I claim the foregoing as my own I have hereto affixed my signature in the presence of two witnesses.

JOHN JAMES THOMPSON.

Witnesses:
R. B. TEEFY,
J. R. KOCH.